Figure 1:
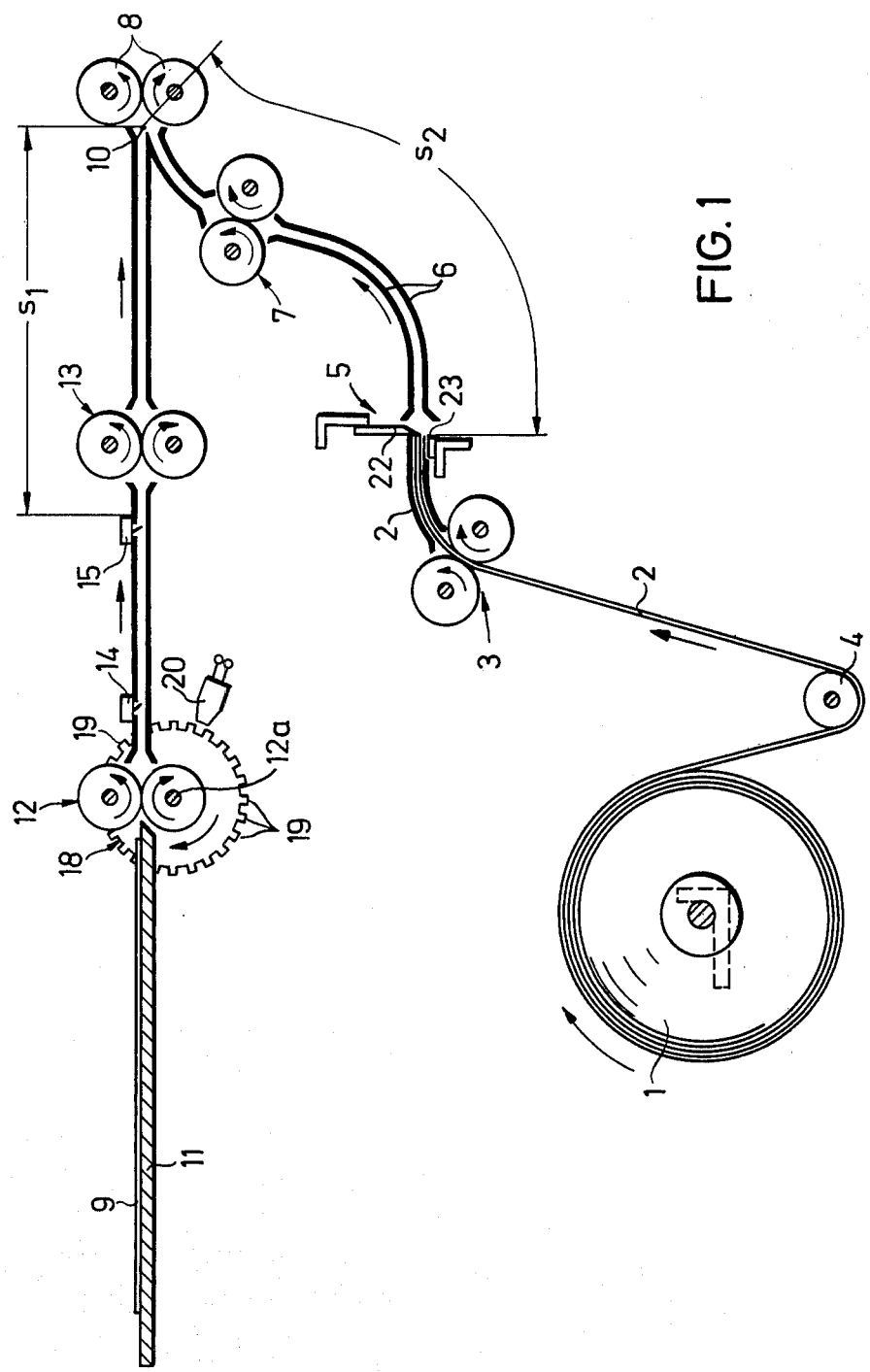

United States Patent [19]
Schröter

[11] 3,948,130
[45] Apr. 6, 1976

[54] DEVICE FOR CONTROLLING THE FEED OF COPYING MATERIAL IN COPYING MACHINES

[75] Inventor: Herbert Schröter, Taunusstein, Germany

[73] Assignee: Hoechst Aktiengesellschaft, Germany

[22] Filed: Dec. 23, 1974

[21] Appl. No.: 535,354

[30] Foreign Application Priority Data
Dec. 24, 1973 Germany............................ 2364672

[52] U.S. Cl. ........................ 83/203; 83/221; 271/9; 355/13
[51] Int. Cl.[2] .......................................... B26D 5/20
[58] Field of Search .......... 271/9, 258, 259; 83/203, 83/205, 221, 358, 359; 355/13; 270/58

[56] References Cited
UNITED STATES PATENTS

| | | | |
|---|---|---|---|
| 3,715,944 | 2/1973 | Knechtel et al................... | 83/203 X |
| 3,722,340 | 3/1973 | Kobayashi............................ | 83/203 |

Primary Examiner—Evon C. Blunk
Assistant Examiner—Bruce H. Stoner, Jr.
Attorney, Agent, or Firm—James E. Bryan

[57] ABSTRACT

A device for controlling the feed mechanism for copying material is connected to a coupling at the feed mechanism of the copying material in order to ensure that the respective leading edges of an original and the copying material are fed to a copying zone in congruence irrespective of the throughput speed. For easy adjustment this device is built up with a pulse generator in synchronism with the movement of the original feed mechanism and with a pulse counter the output of which is connected to the coupling. The counter counts the number of pulses in a predetermined period of time and stores this number. Further, the counter counts a second number of pulses occurring after the predetermined period and produces an output signal when the second number of pulses is equal to a predetermined number of pulses less the stored count.

9 Claims, 4 Drawing Figures

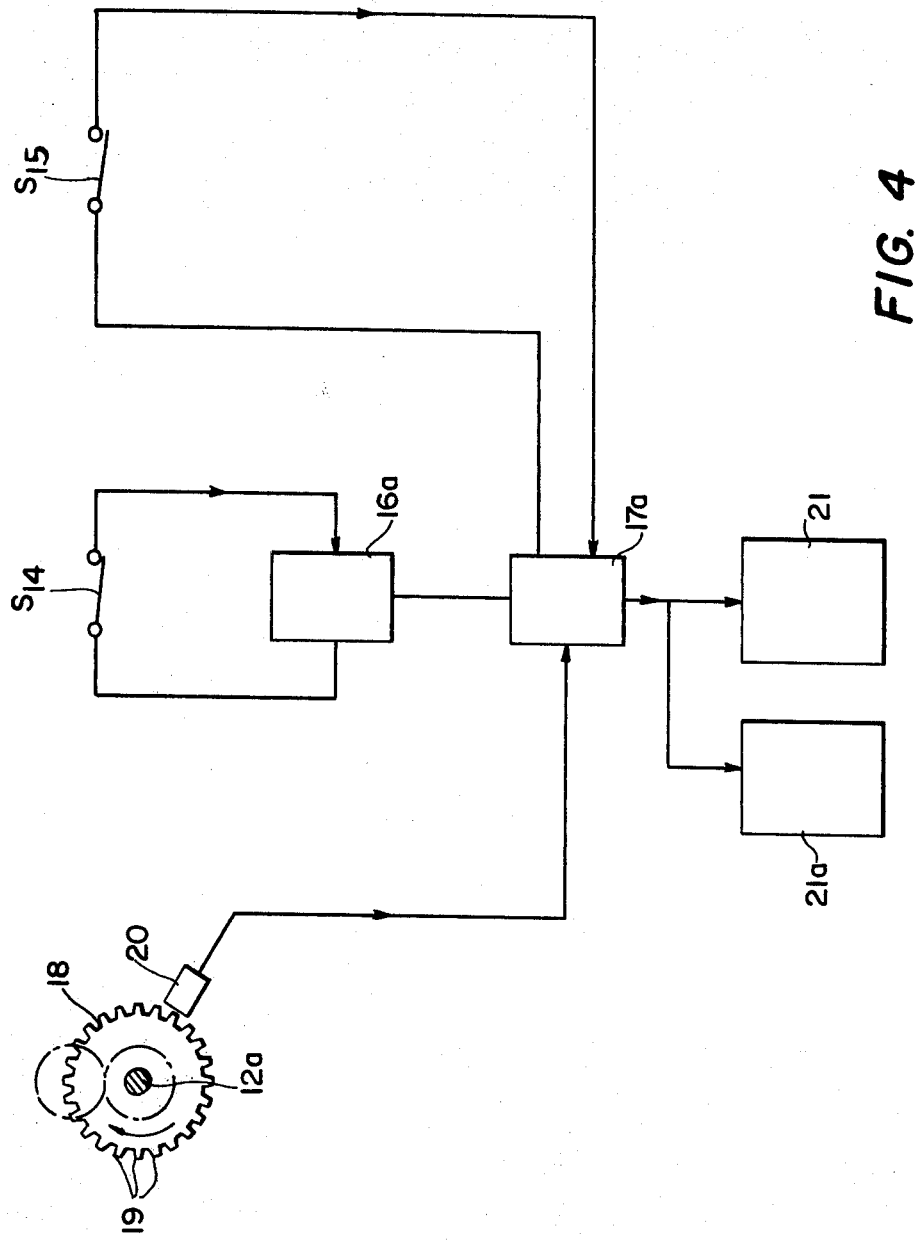

DEVICE FOR CONTROLLING THE FEED OF COPYING MATERIAL IN COPYING MACHINES

The invention relates to a device for controlling the feed of copying material in copying machines.

Various proposals already have been made to ensure that, in copying machines, the original and the copying material, onto which the original is to be copied, are together conveyed in congruence to the copying zone of the machine where copying is effected. Furthermore, the copying material should be cut in accordance with the length of the original in the case where the copying material is stored in the form of rolls in the machine. For the purpose of bringing the leading edge of the original and of the copying material into congruence, the delays arising from inertia when starting the feed forward mechanism for the copying material, the particular throughput rate of the copying machine and the distances which the original and the copying material have to cover up to their meeting point must be taken into account.

In the device disclosed in German Offenlegungsschrift No. 1,497,492, for the automatic control of the copying material feed mechanism and cutting mechanism as a function of the length of the original, the various points of time at which, on the one hand the feed mechanism is switched on and, on the other hand, that mechanism is switched off and the cutting mechanism is actuated, are controlled by two separate switches disposed in the path of the original, the distance between the switches being adjusted accordingly. When operating at the particular throughput speed for which the switches have been adjusted, such a device brings the original and the copying material accurately into congruence and lengths of copying material are obtained which are equal to the lengths of the originals.

However, the situation is different if the operating speeds deviate from this particular throughput speed. Since, in a copying machine, the throughput speed varies, the device just described is often unsatisfactory, because it cannot automatically take account of different throughput speeds.

A device in which differing throughput speeds are taken into account, is described in German Offenlegungsschrift No. 2,142,867. In this device, an electronic time computer is started, by a voltage signal as soon as a switch positioned in the path of the original is actuated by the leading edge thereof, and this computer calculates, as a function of the throughput speed, the time interval after which the feed mechanism for the copying material must be actuated. In addition to the magnitude of the voltage, which is supplied to the computer from a tachogenerator linked to the original drive motor, the time calculated by this computer also depends upon the voltages which are supplied to it by several potentiometers which take account of the individual characteristics of the copying material feed mechanism. This device makes it possible for the original and copying materials always to meet in congruence. Furthermore, the copying material is cut to a length, dependent upon the length of the original. However, the adjustment of this device is somewhat difficult.

According to the present invention there is provided a device for controlling the feed mechanism for copying material to ensure that the respective leading edges of an original and the copying material are fed to a copying zone in congruence, the device being for use in a copying machine in which the original and sheet copying material stored in the machine and onto which the original is to be copied are together fed to a copying zone of the machine where copying is then effected, the device comprising:

means to generate pulses in synchronism with movement of the original feed mechanism, means responsive to the pulses, means to count the number of pulses in a predetermined period of time and to store the number of pulses counted in that period of time, means to count a second number of pulses occurring after the predetermined period of time and to provide an output signal when the second number of pulses is equal to a predetermined number of pulses less the stored count, and means responsive to the output signal to start feed of the copying material.

As has already been explained above, the time interval, designated waiting time tw in the following text, which elapses between the time at which a switch in the path of the original is actuated by the leading edge of the original and the time at which the feed forward mechanism for the copying material is switched on, depends upon several factors. The leading edges of the original and copying material will meet only at the correct time and thereby come into congruence, if these factors are taken into account. Waiting time tw depends on the distances, designated $s_1$ and $s_2$, which the original and the copying material respectively have to cover up to their meeting point, and also on the particular throughput speed of the copying machine and on a time $t_K$. The time $t_K$ takes account of the individual characteristics of the feed forward mechanism for the copying material, that is to say the time which elapses, because of "inertia", between the giving of the starting signal and the actual starting of the feed forward mechanism for the copying material. The time $t_1$, which the original requires to pass from the switch to the meeting point with the copying material, must be exactly as long as the sum of the waiting time $t_w$, the time $t_K$ and the time $t_2$ that the copying material requires to pass from the starting point to the meeting point. Hence the following equation applies: $t_1 = t_2 + tw + t_K$ (1). If, in equation (1), the times $t_1$ and $t_2$ are replaced by the quotients $s_1/v$ and $s_2/v$, respectively, $v$ denoting the throughput speed of the copying machine, and the equation is solved for the waiting time $tw$, the following equation applies:

$$tw = \frac{s_1 - s_2}{v} - t_K \qquad (2).$$

This time tw must be such that, as soon as the leading edge of the original actuates the switch, the feed forward mechanism for the copying material is switched on when the time tw has elapsed. The following text describes how the time tw is determined using a preferred embodiment of the invention.

Two switches are arranged successively in the path of the original in advance of the meeting point with the copying material. A disc is in driven connection with the original feed mechanism, for example a carrier roller which conveys the original, and preferably rotates at a speed which is identical, or proportional through gearing, to the speed of the carrier roller. The disc is provided at regular intervals along its circumference with markings. For example, a toothed disc or a perforated disc can be used. A stationary sensor is arranged in such a way that it can sense a marking each time the latter passes the sensor. If a toothed disc is used, it is possible, for example, to employ an inductive approach switch as the sensor; a photosensitive element can, for example, be used in the case of a perforated disc.

Each time a marking on the disc passes the sensor, the sensor transmits pulses to a counter. The sensor either can continuously sense the markings on the disc and transmit pulses, or can do this only when the leading edge of the original actuates the first switch. The counter, however, is started only via a timing pulse generator, when the first switch is actuated by the leading edge of the original. For the duration of a fixed time pre-set by the timing pulse generator, the counter counts the pulses emitted by the sensor and hence the markings of the disc which pass the sensor. When the time which has been set on the timing pulse generator has elapsed, the counter is stopped and counting interrupted. As soon as the leading edge of the original actuates the second switch, counting of the pulses emitted by the sensor is continued, that is to say from the number which had been reached at the first count. The counter counts until a predetermined number set on it has been reached, and then it transmits a signal to switch on the feed mechanism for the copying material.

The number of markings which pass the sensor during a constant time $\bar{t_K}$ and which correspond to a certain distance $s_3$, for example a distance on the disc or in the path of the original, are counted in the first count, the number of markings reached during the time $\bar{t_K}$, and hence also the distance $s_3$, depending on the speed of rotation of the disc and therefore on the throughput speed of the copying machine. Thus the following equation applies:

$$s_3 = v \cdot \bar{t_K} \quad (3)$$

In the further count which starts when the second switch is actuated, there is determined the time which is required by the sensor to sense a number of markings. This number corresponds to the numerical difference between a fixed number, pre-set at the counter, and the number reached in the first count. The difference in the number of markings in turn corresponds to a difference in distance, for example on the disc, that is to say the difference between a fixed pre-set distance s and the distance $s_3$ which was reached in the first count. Of course, the time which is required for counting the difference in the number of markings or for covering the difference in distance also depends upon the speed of rotation of the disc and hence upon the throughput speed v. Thus the following equation applies:

$$s - s_3 = v \cdot \bar{t_W} \quad (4).$$

If equation (3) is substituted into equation (4) and the latter is solved for the time $\bar{t_W}$, the expression $$\bar{t_W} = s/v - \bar{t_K} \quad (5)$$

is obtained. In this equation, s is a fixed pre-set value, as is the difference of the distances $s_1 - s_2$ in equation (2); furthermore, $\bar{t_K}$ is a fixed pre-set time as is $t_K$. The time $\bar{t_W}$ which the counter determines and which elapses between the actuation of the second switch by the leading edge of the original and the transmission of the signal from the counter to the feed forward mechanism for the copying material, to switch the latter on, can be equated to the waiting time tw contained in equation (2), if 1. the fixed pre-set distance s is equal to the difference of the distances $s_1 - s_2$, that is to say a number which is assigned to this difference of the distances is pre-selected at the counter, and
2. the fixed time $\bar{t_K}$ pre-set at the counter is equal to the time $t_K$ which takes account of the "inertia" of the feed forward mechanism.

Thus, when the leading edge of the original actuates the second switch in the path of the original, a time tw which, as shown above, depends upon the throughput speed v, is determined by means of the disc, the sensor and the counter, and the feed forward mechanism for the copying material is set in motion when this time has elapsed.

The timing pulse generator may be, for example, an electronic line transient relay on which a predetermined time can be set. The pulse length starts with the closing of a starting contact triggered by the actuation of the first switch by the leading edge of the original. The relay returns to its starting position, when the line transient time has elapsed, and at the same time completes the first count in the pulse counter. Suitable electronic line transient relays are available from, for example, Messrs. Pilz KG, Esslingen, Germany.

An electro-mechanical pulse counter, comprising an electromagnetic drive system and a system of mechanical figure drums, for example, may be used as the counter. Switching takes place by means of electric current pulses emitted by the sensor. The pulse counter is of the type on which a predetermined number can be set and which actuates a contact when this number has been reached and thus transmits a signal, and which, furthermore, re-sets itself to the starting number. Additive or subtractive setting counters may be used. In the first case, the counter runs from zero to the preselected number and then actuates a contact and switches itself back to zero again. In the second case, the counter runs in a subtractive manner from the preselected number to zero and then actuates a contact and re-sets itself to the preselected number.

The switches in the path of the original may be mechanical switches, for example micro-switches, or photo-electric switches, for example reflected light probes. The feed forward mechanisms for both the original and the copying material may comprise, for example closed loop conveyor belts, roller pairs or the like.

The device according to the invention is suitable for copying machines in which copying material is stored therein in the form of sheets, as well as for those machines in which the copying material is stored therein in the form of a continuous web on a stock roll. Of course, several stacks of sheets or several stock rolls can be stocked in the copying machine, the original actuating, for example, different switches in its path depending upon its width and, depending on which switches are actuated, one of the types of copying material is selected. The device according to the invention is suitable for any machine in which two pieces of material must be brought into congruence; there may be mentioned, for example, thermographic machines and blueprinting machines.

The salient point in copying machines in which the copying material is stocked in the form of sheets is that the leading edges of the original and copying material sheet are brought into congruence. Since the length of the sheet of copying material is predetermined, it is not important for the feed forward mechanism for the copying material to be switched off at an accurate point in time, after the sheets have come together.

If, however, the copying material is held on stock rolls from which copying material is drawn off in accordance with the length of the original, accurate control of the cutting device and, where appropriate, of the switching off of the feed forward mechanism is important. The above explanations of the control of switching-on of the feed forward mechanism for the original correspondingly apply to the switching-off thereof, and this control may be effected by the trailing edges of the original. Thus, the same counter and timing pulse generator can be used if the times between giving the signal for switching-on and the actual switching-on and the times between giving the signal for switching-off and the actual switching-off are equal. If this is not the case, a separate timing pulse generator and counter are used which respond when the two switches in the path of the original are actuated by the trailing edge thereof. The same applies for controlling the cutting device. Since this device usually will have inertia times which are different from those of the feed forward mechanism, an additional timing pulse generator and counter usually will be required for this purpose, which are controlled by two switches in the path of the original being actuated by the trailing edge thereof.

Figure 2:
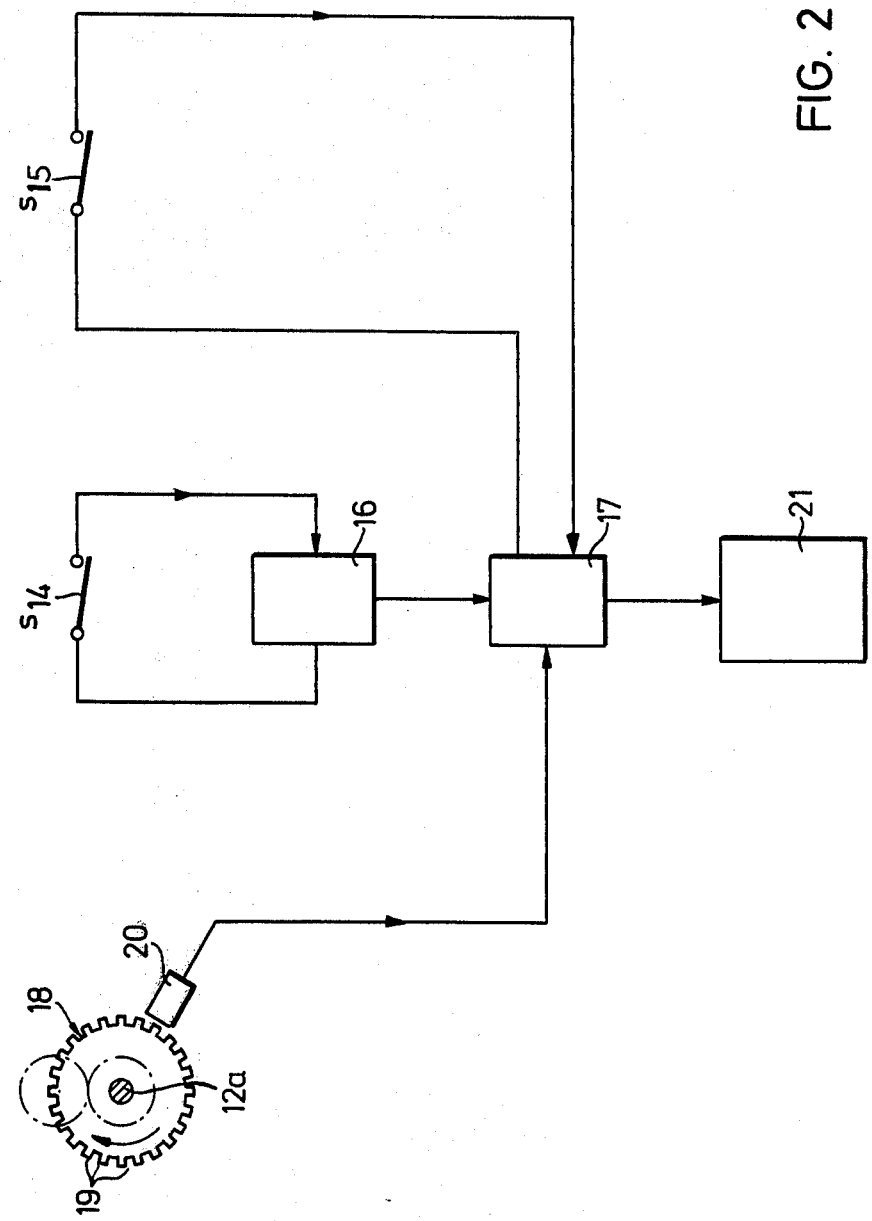
Figure 3:
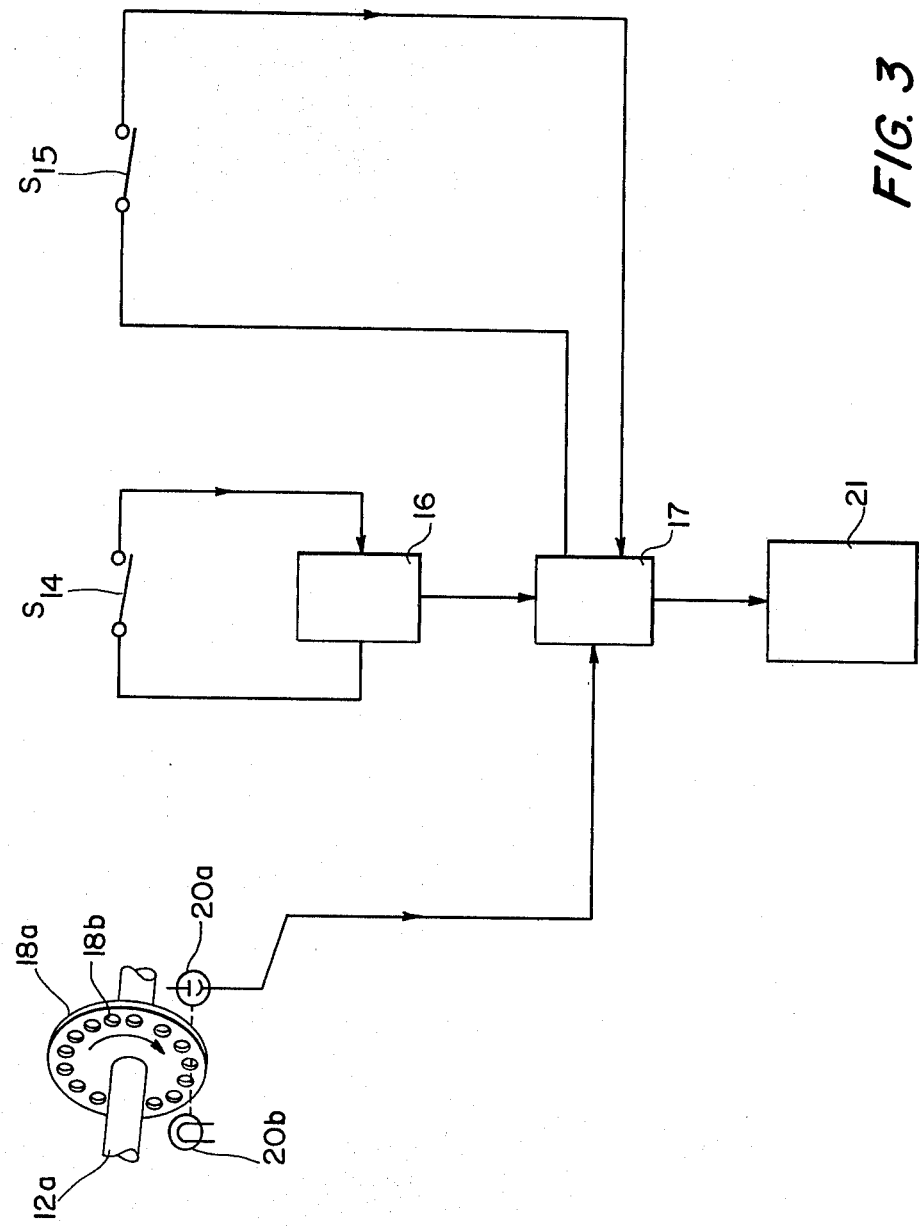

A device of the invention will now be described, by way of example only, with reference to the accompanying drawings in which FIG. 1 is a diagrammatic section through the feed forward mechanism and the cutting mechanism of a copying machine incorporating a device of the invention, FIG. 2 is a schematic circuit diagram for use in a device of the invention in order to bring the leading edges of the original and the copying material into congruence, FIG. 3 is a schematic circuit diagram for use in a device of the invention modified relative to FIG. 2, and FIG. 4 is a schematic circuit diagram for use in a device of the invention in order to obtain copying material of the same length as the length of the original 9.

Referring to FIG. 1 of the drawings, a web 2 of copying material is stored on the roll 1, from which it is drawn off by means of a pair of feed forward rollers 3 via a roller 4 and is transported through the cutting device 5, which consists of an upper knife 22 and a lower knife 23, and between the guides 6 to the pair of rollers 7 and hence to the pair of rollers 8 where the web 2 of the copying material meets the original 9 at the point 10. The web 2 of copying material and an original 9 are transported by the pair of rollers 8 to the copying zone of the machine (not shown). The original 9 is introduced into the machine via the insertion table 11 and, is transported to the meeting point 10 by pairs of rollers 12 and 13. Switches 14 and 15 are disposed in the path of the original 9.

When the leading edge of the original 9, on its way to the meeting point 10, actuates the switch 14, a relay is excited which switches an associated electrical switch $S_{14}$ (see FIG. 2). A timing pulse generator 16 thereby receives a pulse and starts a pulse counter 17. A toothed disc 18, each tooth 19 of which yields a pulse as it passes by a sensor 20, is coaxially attached to the axle 12a of one of the feed forward rollers of the pair of rollers 12. These pulses are transmitted to the pulse counter 17 by the sensor 20; however, they are counted only if the pulse counter 17 has been started by the timing pulse generator 16 and during the time $t_K$ (as hereinbefore defined) set on the timing pulse generator 16. Time $t_K$ depends upon the individual properties of the feed forward mechanism 3 used in the machine and of the stock roll 1 of copying material 2, and it must be determined experimentally. Counting of the pulses by the pulse counter 17 is interrupted when the time $t_K$ has elapsed. As soon as the leading edge of the original actuates the second switch 15, which in turn switches the electrical switch $S_{15}$ via a relay, counting of the pulses emitted by the sensor 20 is resumed until a predetermined number set on the pulse counter 17 is reached. As soon as that number is reached, the pulse counter 17 gives a signal to a coupling 21 at the feed forward mechanism 3, in order to start the latter and to transport the copying material 2 from the cutting point 5 in the direction of the meeting point 10. The leading edges of the original 9 and of the copying material 2 are thereby brought into congruence at the meeting point 10.

At a high throughput speed of the machine, the toothed disc 18 rotates relatively quickly. On the other hand it rotates slowly at a low throughput speed. An example should be mentioned, as follows: in the first count, in the case of the throughput speed $v_1$ ($v_1$ is assumed to be small) the pulse counter 17 counts, for example, fifteen pulses during the fixed pre-set time $t_K$, that is to say fifteen teeth 19 are counted. When $t_K$ has elapsed, this number remains on the pulse counter 17. Upon actuation of the switch 15, the pulse counter 17 is re-started and continues to count the pulses emitted by the sensor 20, until the predetermined number set on it, for example forty, is reached. This predetermined number will depend, as is explained earlier, on several factors and may be determined experimentally. For a given machine and device of the invention, however, it is a constant. The time $tw_1$ which is needed for counting from fifteen to forty, of course also depends on $v_1$. In the case of a throughput speed $v_2$ (the magnitude of $v_2$ is assumed to be twice that of $v_1$) 30 pulses will be counted in the first count, i.e. in the time $t_K$. In the resumed count, the pulse counter has to count only ten more pulses in order to reach the fixed predetermined number of counts, i.e. 40. Of course, the time $tw_2$ for this second count is correspondingly shorter than $tw_1$, since firstly, only 10 further pulses are to be counted and, secondly, the speed $v_2$ is higher. It will be appreciated, therefore, that the device of the invention serves to bring the original 9 and the copying material 2 into congruence, irrespective of the throughput speed v of the machine.

Referring to FIG. 3 a disc 18a having a plurality of apertures 18b is coaxially attached to the axle 12a instead of the toothed disc 18 in FIG. 2. A plurality of apertures 18b is provided in the disc regularly spaced in a circle about the edge of this disc. A light source 20b faces one side of the disc while a sensor 20a faces the other side of the disc. The sensor 20a and the light source 20b are arranged in a mutual relationship such that at least a portion of the light originating from the light source can reach the sensor through one of the apertures at a time. In this case the sensor will generate a pulse which is fed into the pulse counter 17.

The above considerations with respect to FIG. 2 apply to the switching-off of the pair of feed forward rollers 3 and to the actuation of the upper knife 22 of the cutting device 5, accordingly, in order to obtain copying material of the same length as the length of the original 9.

Referring to FIG. 4 this control is effected by the trailing edge of the original 9 (shown in FIG. 1) optionally by means of a separate timing pulse generator 16a and counter 17a, which, after the calculated waiting time, acts upon a coupling and brake (not shown) of the feed forward mechanism 3 (shown in FIG. 1) and upon a coupling 21a of the cutting device 5.

It will be obvious to those skilled in the art that many modifications may be made within the scope of the present invention without departing from the spirit thereof, and the invention includes all such modifications.

What is claimed is:

1. A device for controlling the feed mechanism for copying material to ensure that the respective leading edges of an original and the copying material are fed to a copying zone in congruence, the device being for use in a copying machine in which the original and sheet copying material stored in the machine and onto which the original is to be copied are together fed to a copying zone of the machine where copying is then effected, the device comprising means to generate pulses in synchronism with movement of the original feed mechanism, means responsive to the pulses, means to count the number of pulses in a predetermined period of time and to store the number of pulses counted in that period of time, means to count a second number of pulses occurring after said predetermined period of time and to provide an output signal when the second number of pulses is equal to a predetermined number of pulses less the stored count, and means responsive to the output signal to start feed of the copying material.

2. A device as claimed in claim 1 wherein the means to generate pulses comprises a disc rotatably drivable by the original feed mechanism, the disc having around its circumference s plurality of regularly spaced teeth, and a sensor adapted to generate a pulse each time a tooth of the disc passes the sensor.

3. A device as claimed in claim 1 wherein the means to generate pulses comprises a disc rotatably drivable by the original feed mechanism, the disc having a plurality of apertures therein regularly spaced in a circle about the edge of the disc, a light source facing one side of the disc and, a sensor facing the other side of the disc and adapted to generate a pulse each time light from the light source reaches the sensor through one of said apertures.

4. A device as claimed in claim 1 further comprising first switch means, actuatable by the leading edge of the original, to start the pulse count for said predetermined period of time.

5. A device as claimed in claim 4 further comprising a timing pulse generator actuatable by the first switch means, the timing pulse generator being adapted to start the pulse count for said predetermined period of time.

6. A device as claimed in claim 1 further comprising second switch means, actuatable by the leading edge of the original, to start the count of said second number of pulses.

7. A device as claimed in claim 1 for use in a copying machine in which the sheet copying material is stored in the machine in the form of a roll, the machine including cutting means to cut a length of copy material from the roll, the device further comprising means to count the number of pulses in a second predetermined period of time and to store that number of pulses, means to count a second number of pulses occurring after said second predetermined period of time and to provide a second output signal when the second number of pulses is equal to a predetermined number of pulses less the stored count, and means responsive to the second output signal to actuate the cutting means to cut the desired length of copying material from the roll.

8. A device as claimed in claim 7 including first switch means actuatable by the trailing edge of the original to start the pulse count for said second predetermined period of time.

9. A device as claimed in claim 7 including second switch means actuatable by the trailing edge of the original to start the count of said second number of pulses.

* * * * *